United States Patent
Paul et al.

(10) Patent No.: US 9,556,391 B2
(45) Date of Patent: Jan. 31, 2017

(54) METHOD FOR PRODUCING RENEWABLE HYDROGEN FROM BIOMASS DERIVATIVES USING STEAM REFORMING TECHNOLOGY

(71) Applicant: Phillips 66 Company, Houston, TX (US)

(72) Inventors: Uchenna Prince Paul, Bartlesville, OK (US); Joe D. Allison, Bartlesville, OK (US); Kristi A. Fjare, Bartlesville, OK (US); Roland Schmidt, Wiehl (DE)

(73) Assignee: Phillips 66 Company, Houston, TX (US)

( * ) Notice: Subject to any disclaimer, the term of this patent is extended or adjusted under 35 U.S.C. 154(b) by 0 days.

(21) Appl. No.: 13/936,247

(22) Filed: Jul. 8, 2013

(65) Prior Publication Data

US 2014/0014878 A1 Jan. 16, 2014

Related U.S. Application Data

(60) Provisional application No. 61/671,305, filed on Jul. 13, 2012.

(51) Int. Cl.
| | |
|---|---|
| *C01B 3/38* | (2006.01) |
| *C10J 3/72* | (2006.01) |
| *C10B 53/02* | (2006.01) |
| *C01B 3/32* | (2006.01) |
| *C10K 3/00* | (2006.01) |
| *C10J 3/66* | (2006.01) |
| *C10K 3/02* | (2006.01) |

(52) U.S. Cl.
CPC .............. *C10J 3/72* (2013.01); *C01B 3/323* (2013.01); *C10B 53/02* (2013.01); *C10J 3/66* (2013.01); *C10K 3/006* (2013.01); *C01B 2203/0233* (2013.01); *C01B 2203/1217* (2013.01); *C10J 2300/1853* (2013.01); *C10K 3/02* (2013.01); *Y02E 50/14* (2013.01); *Y02E 50/32* (2013.01)

(58) Field of Classification Search
CPC ........................................................ C01B 3/32
USPC ........................................................ 252/373
See application file for complete search history.

(56) References Cited

U.S. PATENT DOCUMENTS

| | | | |
|---|---|---|---|
| 7,875,090 B2 | 1/2011 | Dietenberger et al. | |
| 7,998,455 B2 | 8/2011 | Abbas et al. | |
| 2002/0155062 A1* | 10/2002 | Lightner | 423/652 |
| 2003/0103893 A1* | 6/2003 | de Lasa et al. | 423/653 |

(Continued)

FOREIGN PATENT DOCUMENTS

| | | |
|---|---|---|
| EP | 1371713 | 12/2003 |
| JP | 2007023084 | 2/2007 |

(Continued)

OTHER PUBLICATIONS

Sushil Adhikari, Sandun Fernando and Angus Haryanto, "Steam Reforming of Glycerin for Hydrogen Production Over Ni Catalyst", Agricultural and Biological Engineering, Environmental Issues in Energy and Fuels, The 23rd ACS National Meeting, Mar. 2007, 1 page.

(Continued)

*Primary Examiner* — Melvin C Mayes
*Assistant Examiner* — Kenneth Vaden
(74) *Attorney, Agent, or Firm* — Phillips 66 Company (57) ABSTRACT

A process of decomposing a biomass derivative to produce a gaseous product and then introducing the gaseous product into a steam reformer.

17 Claims, 9 Drawing Sheets

(56) References Cited

U.S. PATENT DOCUMENTS

| | | |
|---|---|---|
| 2004/0024279 A1 | 2/2004 | Mason |
| 2007/0225383 A1 | 9/2007 | Cortright et al. |
| 2007/0243128 A1 | 10/2007 | Reichman et al. |
| 2008/0118429 A1 | 5/2008 | Abbas et al. |
| 2010/0051874 A1 | 3/2010 | O'Connor et al. |
| 2010/0200810 A1 | 8/2010 | Schmidt et al. |
| 2010/0222620 A1 | 9/2010 | O'Connor et al. |
| 2011/0003681 A1 | 1/2011 | Speyer et al. |
| 2011/0065814 A1* | 3/2011 | Matson et al. ............... 518/702 |
| 2012/0161451 A1 | 6/2012 | Struble et al. |

FOREIGN PATENT DOCUMENTS

| | | |
|---|---|---|
| JP | 2007091707 | 4/2007 |
| JP | 2009286932 A * | 12/2009 |
| JP | 2010195651 | 9/2010 |
| WO | 2008063485 | 5/2008 |
| WO | 2008130592 | 10/2008 |
| WO | 2011060539 | 5/2011 |

OTHER PUBLICATIONS

Luwei Chen, Catherine Kai Shin Choong, Ziyi Zhong, Lin Huang, Thiam Peng Ang, Liang Hong and Jianyi Lin, "Carbon Monoxide-Free Hydrogen Production Via Low-Temperature Steam Reforming of Ethanol Over Iron-Promoted Rh Catalyst", Journal of Catalysis, 2010, 4 pages.

Haldor Topsoe A/S, "Pre-Reforming Catalysts", 6 pages.

PCT Notification of Transmittal of the International Search Report and the Written Opinion of the International Searching Authority, or the Declaration, International Application No. PCT/US2013/050324; International Filing Date: Jul. 12, 2013, 15 pages.

\* cited by examiner

METHOD FOR PRODUCING RENEWABLE HYDROGEN FROM BIOMASS DERIVATIVES USING STEAM REFORMING TECHNOLOGY

CROSS-REFERENCE TO RELATED APPLICATIONS

This application is a non-provisional application which claims the benefit of and priority to U.S. Provisional Application Ser. No. 61/671,305 filed Jul. 13, 2012, entitled "Method for Producing Renewable Hydrogen from Biomass Derivatives Using Steam Reforming Technology," which is hereby incorporated by reference in its entirety.

STATEMENT REGARDING FEDERALLY SPONSORED RESEARCH OR DEVELOPMENT

None.

FIELD OF THE INVENTION

This invention, relates to producing a gaseous product from biomass derivatives and feeding the gaseous product into a steam reformer.

BACKGROUND OF THE INVENTION

Hydrogen is an important feedstock for the manufacture of chemicals and as a clean fuel in combustion engines. It finds uses in activities such as the manufacture of fertilizers, petroleum processing, methanol synthesis, production of chemicals and fuels, annealing of metals and producing electronic materials. In the foreseeable future, emergence of technology will extend the use of hydrogen to domestic and vehicle applications.

Typically, the primary synthetic routes for the production of hydrogen have consisted of catalytic steam reforming of methane, $C_2$-$C_4$, natural gas, LPG (liquefied petroleum gas), naphtha or other light hydrocarbons. In one method used by the art to produce hydrogen by steam reforming, a methane and steam feed stream is passed through catalyst filled tubes disposed within a reactor or reformer. Fuel and air are combusted outside of the tubes in the reformer to provide heat for the endothermic catalytic reaction taking place within the tubes at about 800° C. In this process, the mixture of methane and steam is converted to a gaseous stream consisting primarily of hydrogen (about 68%) and $CO_2$ (about 21.7%), CO (about 1.5%) and $H_2O$ (about 8.8%).

Other routes have reportedly used the partial oxidation of heavy oil residues and coal gasification from these starting materials. Increased interest in fuel hydrogen production requires the development of economically and environmentally sustainable processes that compete with processes involving derivation of hydrogen gas from hydrocarbons obtained from petroleum and natural gas sources. The world's supply of petroleum is being depleted at an increasing rate. Eventually, demand for petrochemical derived products will outstrip the supply of available petroleum. When this occurs, the market price of petroleum and, consequently, petroleum derived products will likely increase, making products derived from petroleum more expensive and less desirable. As the available supply of petroleum decreases, alternative sources and, in particular, renewable sources of comparable products will necessarily have to be developed. One potential renewable source of petroleum derived products is products derived from bio-based matter, such as agricultural and forestry products. Use of bio-based products may potentially counteract, at least in part, the problems associated with depletion of the petroleum supply.

The replacement of petrochemicals and petroleum derived products with products and/or feed stocks derived from biological sources (i.e., bio-based products) offers many advantages. For example, products and feed stocks from biological sources are typically a renewable resource. As the supply of easily extracted petrochemicals continues to be depleted, the economics of petrochemical production will likely force the cost of the petrochemicals and petroleum derived products to higher prices compared to bio-based products. In addition, companies may benefit from the marketing advantages associated with bio-derived products from renewable resources in the view of a public becoming more concerned with the supply of petrochemicals.

Renewable lignocellulosic biomass feedstocks represent alternative feedstocks for the production of hydrogen. Recent developments in this area have reported the use of renewable carbohydrate feedstocks that are derived from dilute sugar streams and lignocellulosics (i.e. soft and hardwoods, crop residues such as straws, hulls, and/or fibers) to produce hydrogen using thermochemical processes such as pyrolysis and/or gasification.

One problem of using biomass feedstocks with a steam reformer is the increased coking activity on the steam reformer catalyst due to the feedstock. This coking activity causes premature degradation of the steam reformer catalyst. There exists a need for a process to reducing the coking activity inside a steam reformer catalyst.

BRIEF SUMMARY OF THE DISCLOSURE

A process of decomposing a biomass derivative to produce a gaseous product and then introducing the gaseous product into a steam reformer.

In one embodiment the process describes decomposing biomass derivatives at a temperature range from 100° C. to 500° C. to produce a gaseous product with less than 0.5 wt % of coke precursors and at least 1 wt % gaseous hydrogen. This gaseous product is then directly introduced into a steam reformer.

In an alternate embodiment the process also describes a process consisting essentially of decomposing a biomass derivative to produce a gaseous product and then introducing the gaseous product into a steam reformer.

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

The present disclosure describes a process of decomposing biomass derivatives to produce a gaseous product and introducing the gaseous product into a stem reformer.

Different types of biomass derivatives can be used including but not limited to: cellulose, hemicellulose, lignin, polysaccharides, monosaccharides (e.g. glucose, xylose, and galactose), furfural, lignin derived alcohols (coumaryl, coniferyl and sinapyl alcohols), and molecules and derivatives derived from the above listed molecules. Mixtures of these compounds, such as those found in bio-oils derived from fast pyrolysis or liquefaction, are also included in the biomass derivatives definition.

In terms of specific crops that biomass derivatives can be derived from including but are not limited to: crops such as corn, soybeans, wheat, oats, rye, millet, barley, sorghum, triticale, sugar beets, sugarcane, and rice, and grain-like plants such as amaranth and buckwheat. Generally, biomass derivatives can be from any renewable plant source from which polysaccharide molecules can be derived via upgrading/conversion of cellulose, hemi-cellulose and/or lignin including trees, forestry waste and byproducts, algae, and municipal solid waste.

In one embodiment the biomass derivatives are polysaccharide derivatives. In another embodiment the polysaccharide derivatives have a molecular formula of $C_xH_yO_z$, where $z/x$ ranges from 0.1 to 1.0 and $y/z$ ranges from 2.0 to 3.0.

The biomass derivative is then decomposed to produce a gaseous product. This gaseous product comprises varying amounts of methane, carbon monoxide, carbon dioxide and hydrogen. In one embodiment the amount of hydrogen produced is at least 0.5 wt %, 1 wt %, 3 wt %, 5 wt % even 10 wt % of the gaseous product.

In one embodiment the process is able to produce constant levels of hydrogen, carbon monoxide, carbon dioxide, and methane for 1 hour, 5 hours, 10 hours even 20 hours without more than 10%, or even 5% drop in rates.

The gaseous product may also contain some coke precursors. Examples of coke precursors include polynuclear aromatics, alkynes, untreated polysactharides, oxygenated organic compounds and alkenes such as: ethylene, propylene and butenes. In one embodiment the amount of coke precursors produced are less than 0.5 wt %, 0.1 wt %, 0.01 wt % even 0.0001 wt % of the gaseous product; i.e., less than 1 part per million (ppm) by weight.

The minimal to non-existent production of coke precursors in this process is theorized to increase the lifetime of the catalysts used in the steam reformer due to reduced coke build-up. Typical catalysts that are used in steam reformers include but are not limited to $Ni/Al_2O_3$, $Cu/Ni/Al_2O_3$, $Rh/Ni/Al_2O_3$, $Ni/MgO/Al_2O_3$, $Ni/CeO_2/Al_2O_3$, $Ni/Cu/Au/CeO_2/Al_2O_3$, $Fe/Ni/Al_2O_3$, $Cu/Co/CeO_2$, $Ni/Cu/K/Au/CeO_2/Al_2O_3$, $Ni/ZrO_2$, $Ni/CeO_2/ZrO_2$ and $Ni/Cu/CeO_2/ZrO_2$.

The decomposition temperature and pressures of the biomass derivatives are adjusted to obtain the greatest amount of gaseous hydrogen with the lowest amount of coke precursors. In one embodiment the biomass derivative is decomposed in temperature ranges from 100° C. to 550° C., 100° C. to 350° C., even 200° C. to 350° C. The pressure ranges for this decomposition can be 101.3 kPa, 4,000 kPa or even higher.

The gaseous product is then fed into a conventional steam reformer. Any known steam reformer by one skilled in the art could be utilized. The gaseous product will then enter the hot tubes within the stream reformer in which a catalytic reaction would take place causing further conversion of the steam and lighter hydrocarbons into syngas comprising hydrogen and carbon monoxide. The syngas can then be further reacted to give more hydrogen and carbon dioxide.

Example 1

Figure 1:
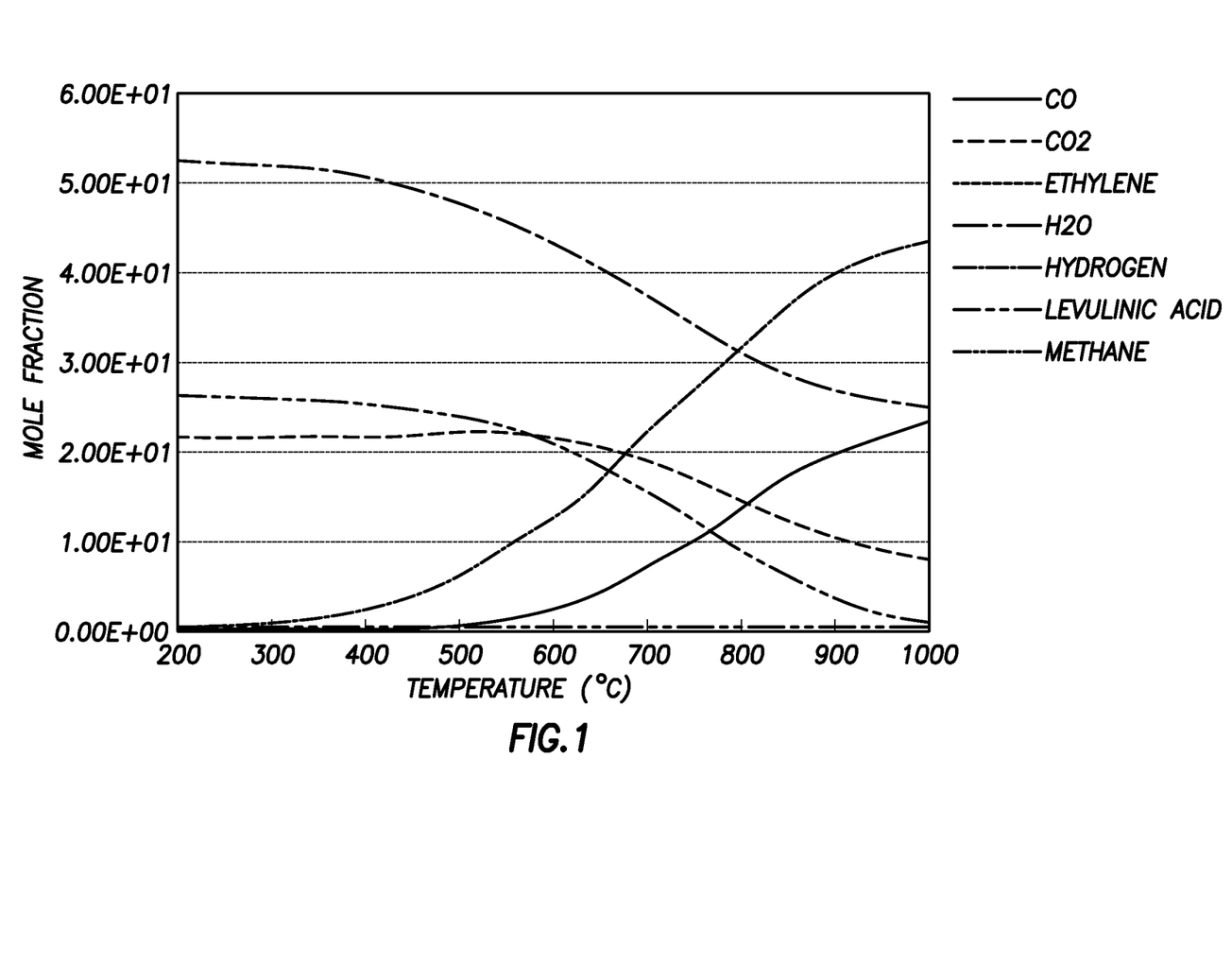
FIG. 1 depicts a species equilibrium composition profile.

In this example a polysaccharide hydrolysis derivative, levulinic acid, $C_5H_8O_3$, was steam reformed at 3000 kPa with increasing temperature. As shown in FIG. 1, the amount of syngas (carbon monoxide, carbon dioxide and hydrogen) is plentiful at lower temperatures. As shown in the species equilibrium composition profile, as the temperatures increase the amount of the syngas decreases and the amount of ethylene increases. Ethylene is a known coking precursor.

Figure 2:
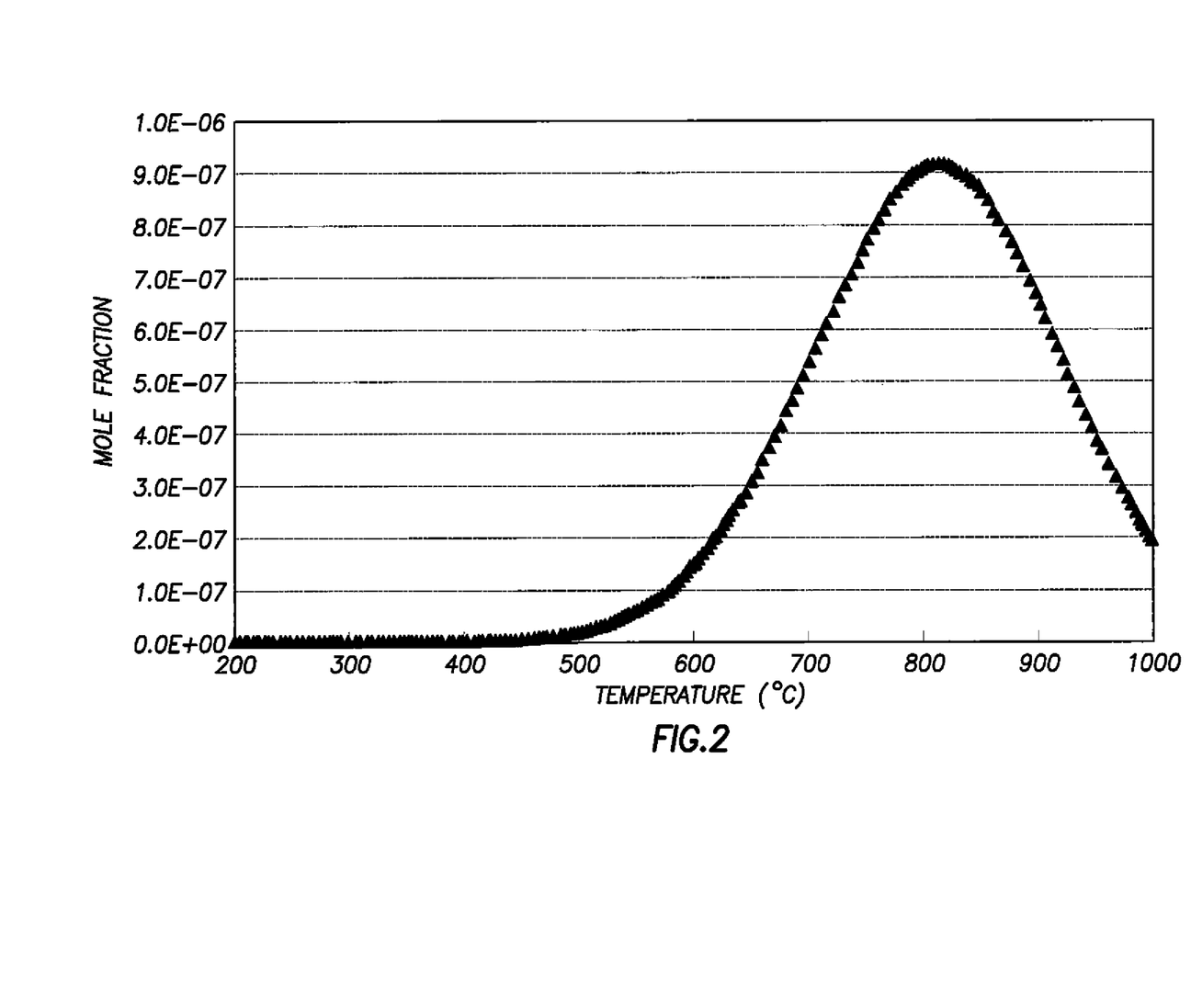
FIG. 2 depicts a species equilibrium composition profile.

As shown in FIG. 2 the mole fraction of ethylene produced from levulinic acid increases significantly as the temperature increases.

Example 2

Figure 3:
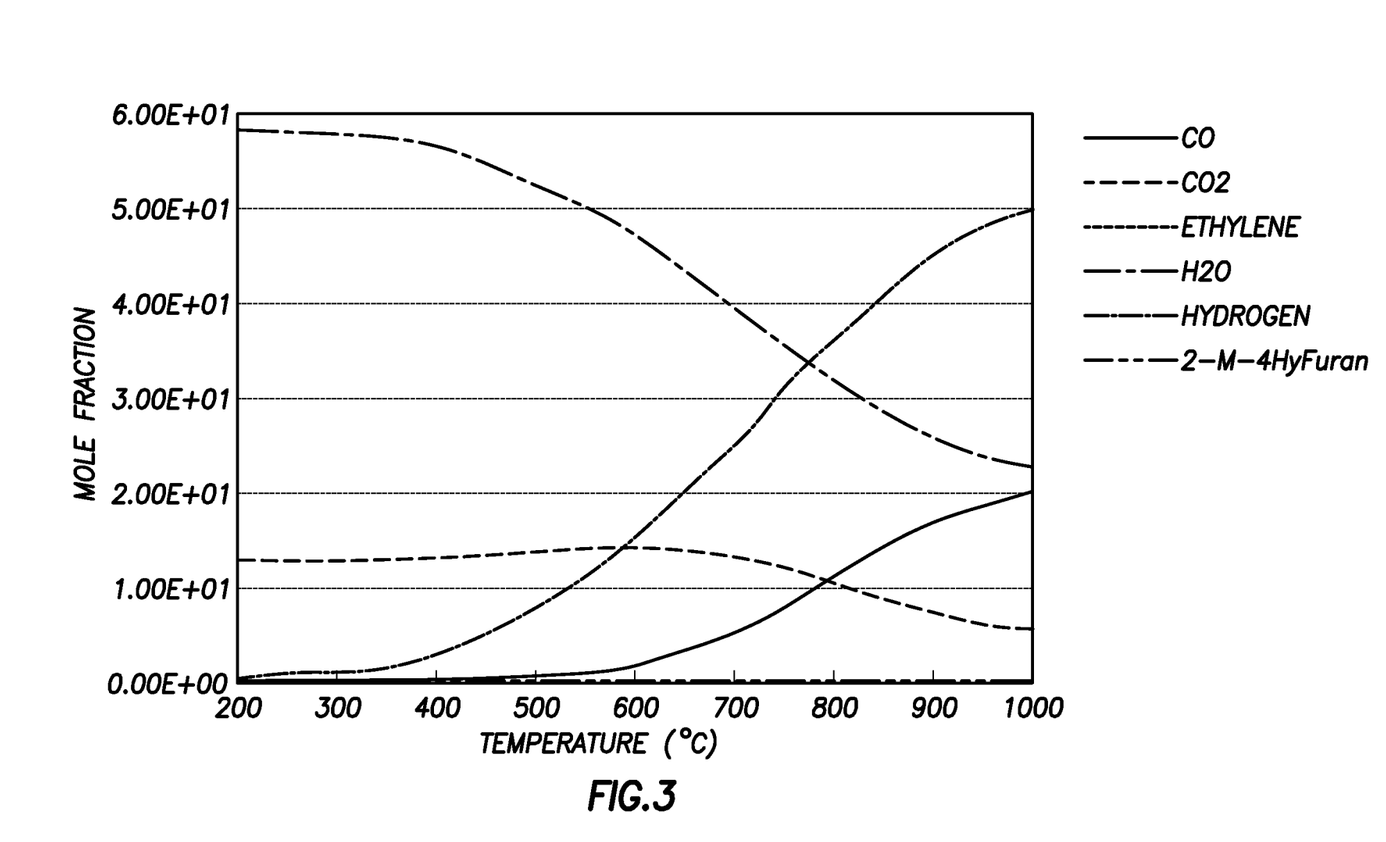
FIG. 3 depicts a species equilibrium composition profile.

In this example a polysaccharide derivative, 2-methyltetrahydrofuran $C_5H_{10}O$, was steam reformed at 3000 kPa with increasing temperature. As shown in FIG. 3, the amount of syngas (carbon monoxide, carbon dioxide and hydrogen) is plentiful at lower temperatures. As shown in the species equilibrium composition profile, as the temperatures increase the amount of the syngas decreases and the amount of ethylene increases. Ethylene is a known coking precursor.

Figure 4:
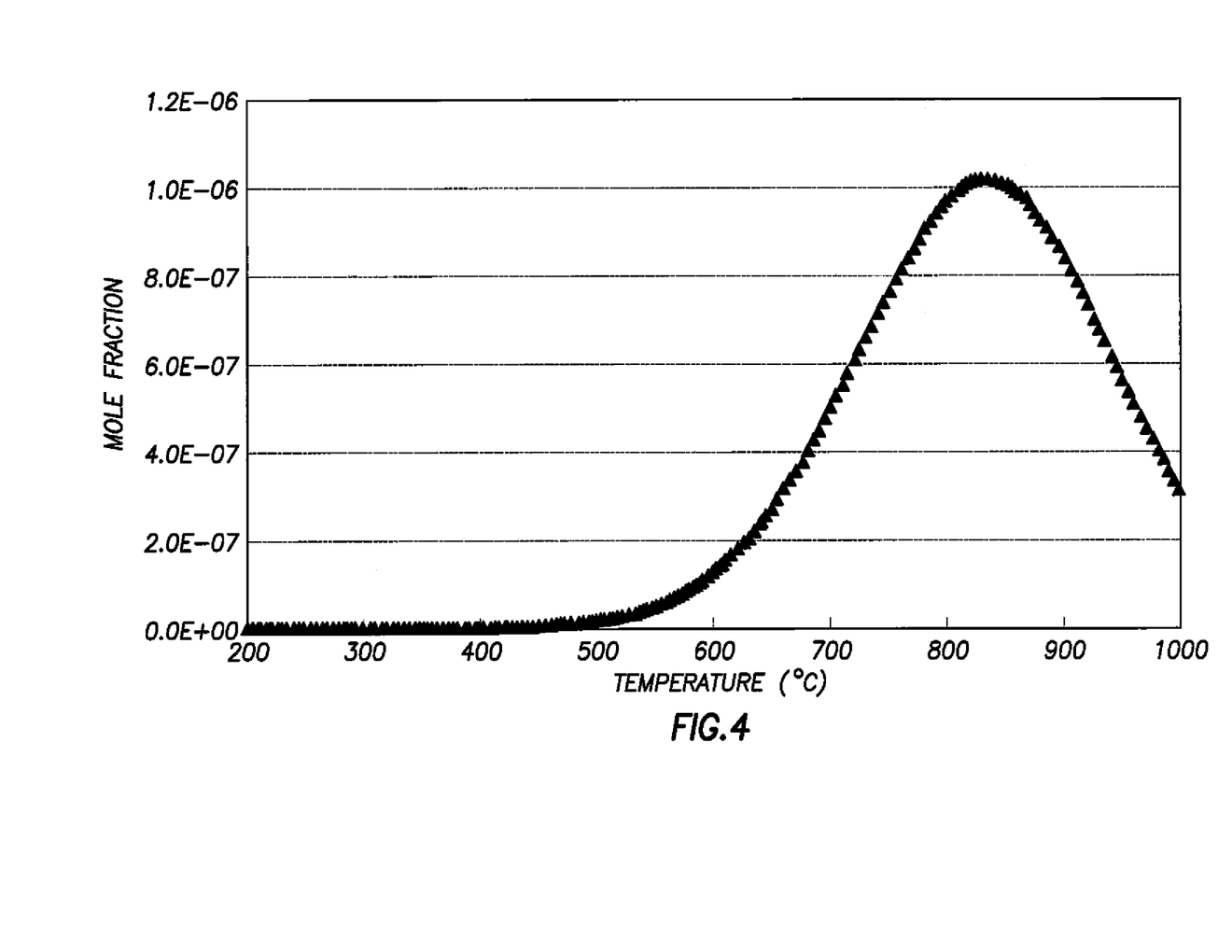
FIG. 4 depicts a species equilibrium composition profile.

As shown in FIG. 4 the mole fraction of ethylene produced from 2-methyltetrahydrofuran increases significantly as the temperature increases.

Figure 5:
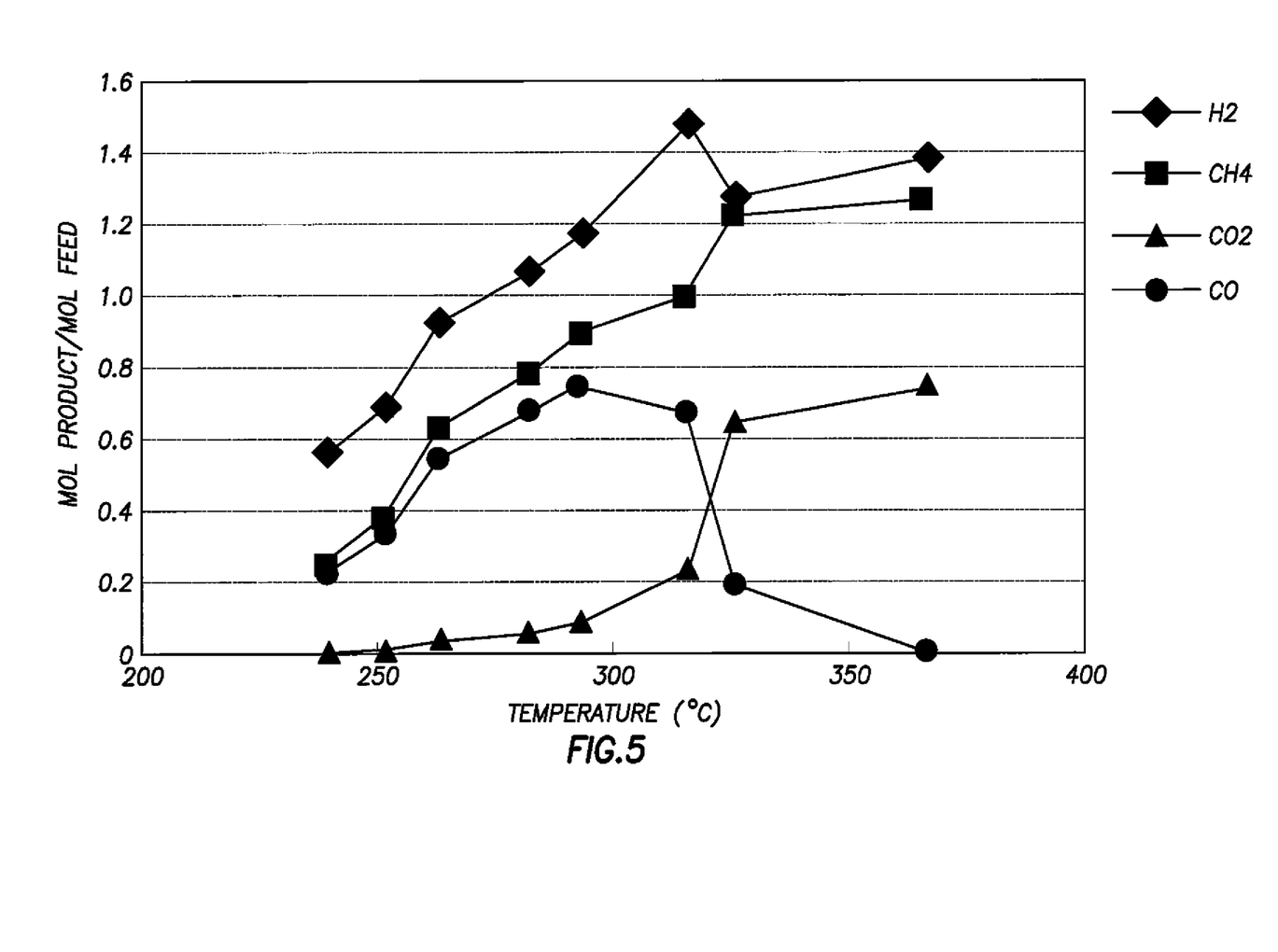
FIG. 5 depicts a gas phase composition during the decomposition of ethanol.
Figure 6:
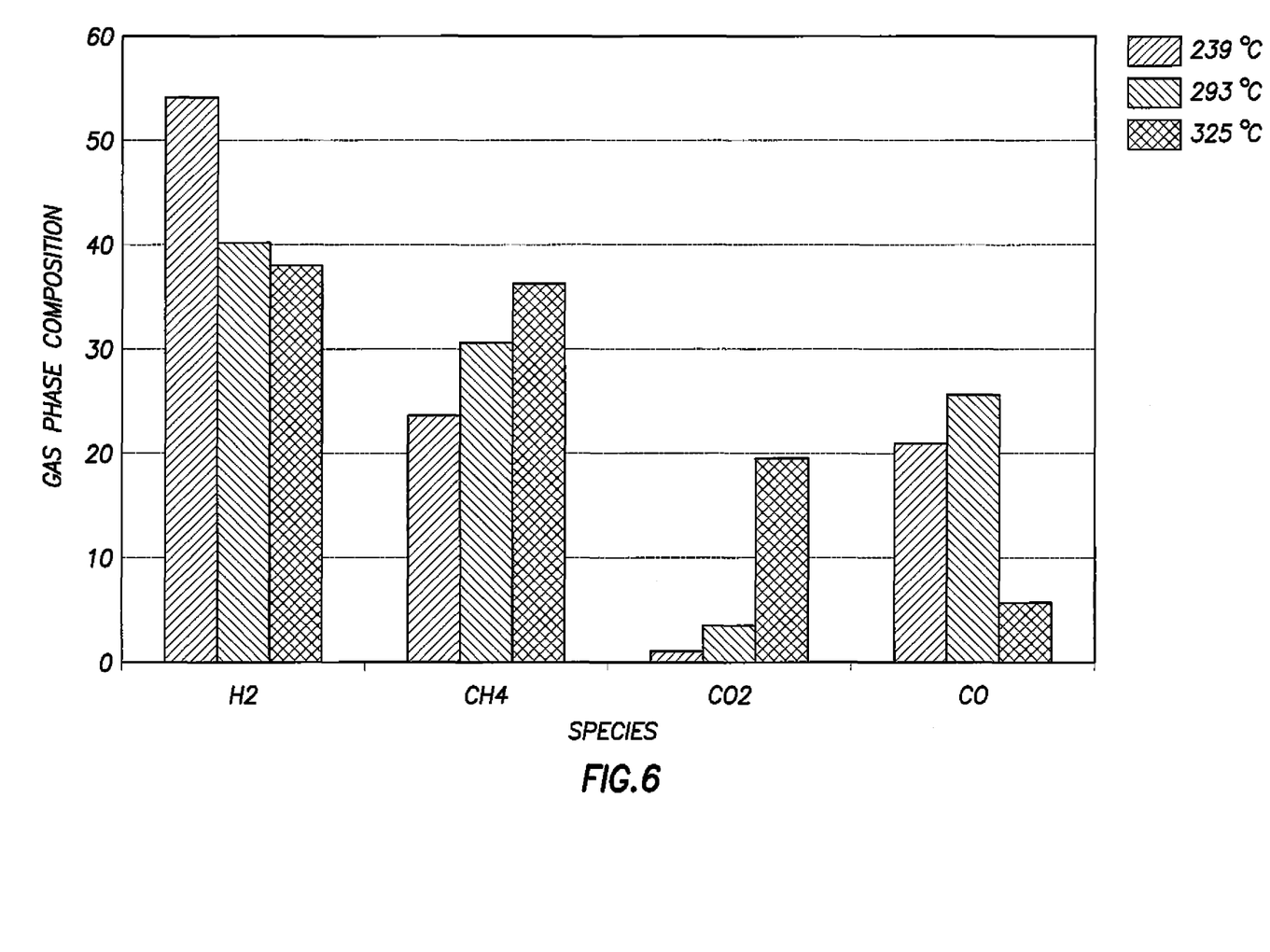
FIG. 6 depicts normalized gas phase composition during ethanol decomposition.
Figure 7A:
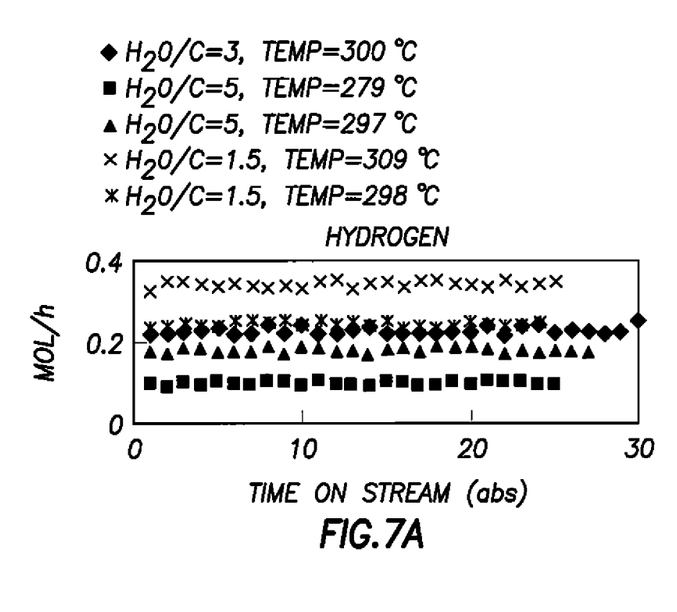
FIGS. 7A, 7B, 7C, and 7D depict product rates of hydrogen, CO, $CO_2$, and methane.
Figure 7B:
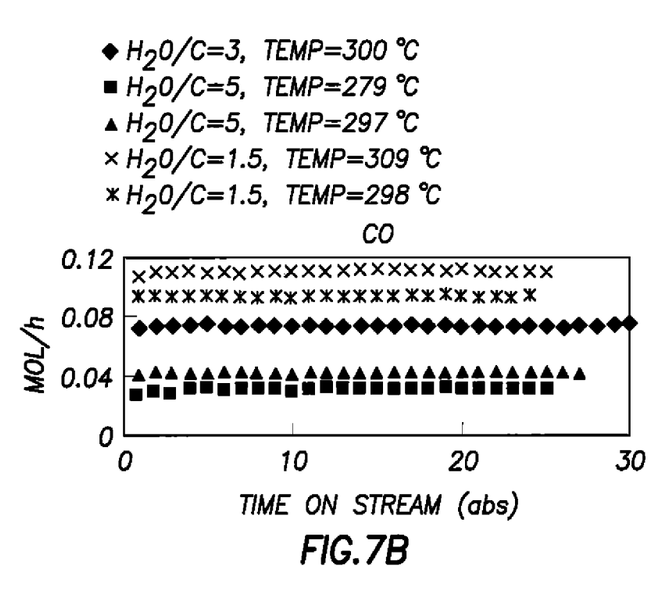
Figure 7C:
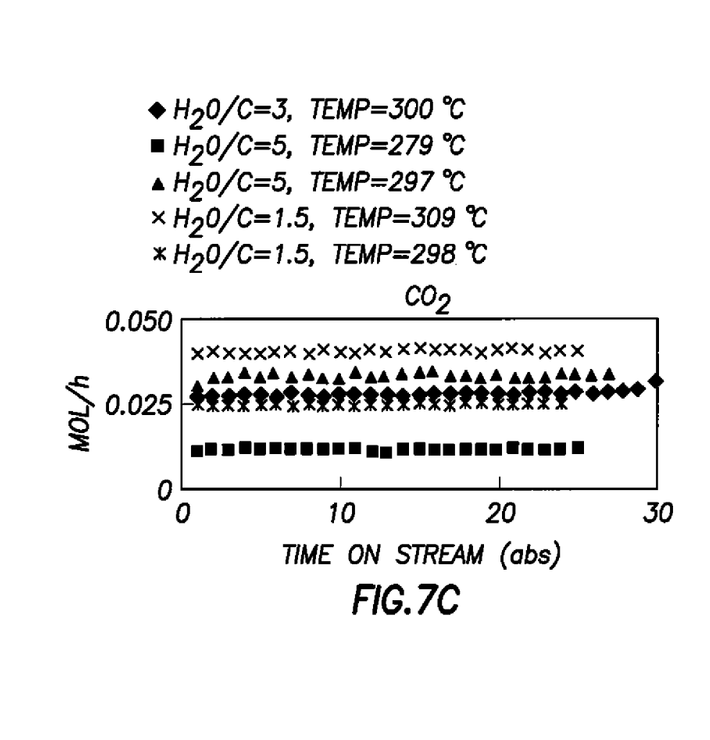
Figure 7D:
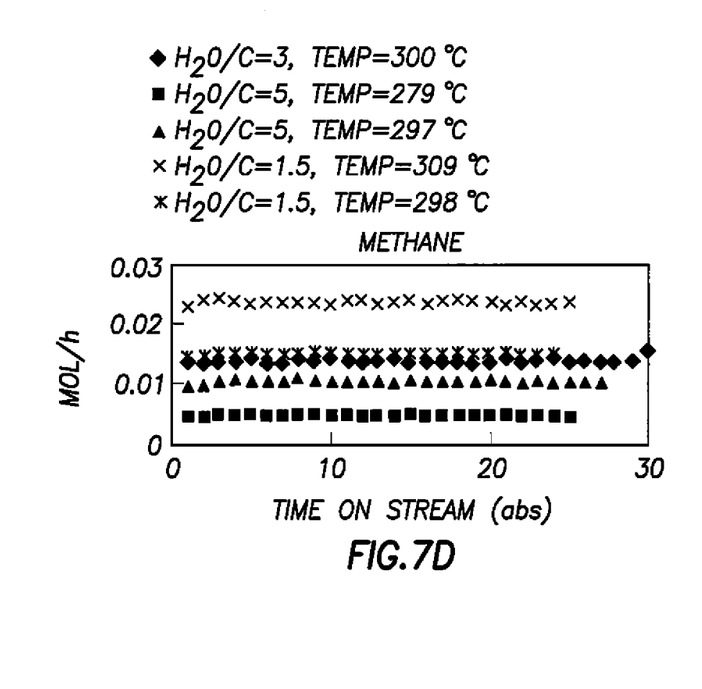

Example 3 in this example a polysaccharide derivative, ethanol, was steam reformed at 790.83 kPa with increasing temperature. The observed major gas phase products were hydrogen, methane, CO, and $CO_2$. As shown in FIGS. 5 and 6, the fraction of syngas (carbon monoxide, carbon dioxide and hydrogen) in the gaseous products is very significant even at lower temperatures. At these conditions, the hydrogen and CO production yields exhibited maxima with temperature, while the $CO_2$ and methane yields continued to increase with temperature. Similarly, ethylene yield was below the detection limit of the gas chromatograph used to analyze the gaseous products which is less than 10 ppm. Ethylene is a known coking precursor in conventional steam methane reformers (SMR).

Example 4

In this example a mixture of biomass-derived oxygenates consisting of 61 wt % methanol, 6 wt % ethanol, 5 wt % 2-propanol, 0.7 wt % 1-propanol, 0.01 wt % propylene glycol, 1.6 wt % $C_{4+}$ alcohols, was diluted with varying amounts of water to obtain feeds with water-to-carbon ratios of 1.5, 3.0, and 5.0, respectively. The feeds were decomposed at 2,170 kPa at varying temperatures. The dominant products are shown in FIGS. 7A, 7B, 7C, and 7D. Similar to Example 5, the amount of syngas (carbon monoxide, carbon dioxide and hydrogen) in the gaseous products was significant even at lower temperatures. Similarly, ethylene yield was below the detection limit of the gas chromatograph used to analyze the gaseous products. Additionally, FIGS. 7A, 7B, 7C, and 7D indicated that there was no significant degradation in process performance since the produced amounts of hydrogen, carbon monoxide, carbon dioxide, and methane remained fairly constant over several hours of continuous operation.

Example 5

Figure 8:
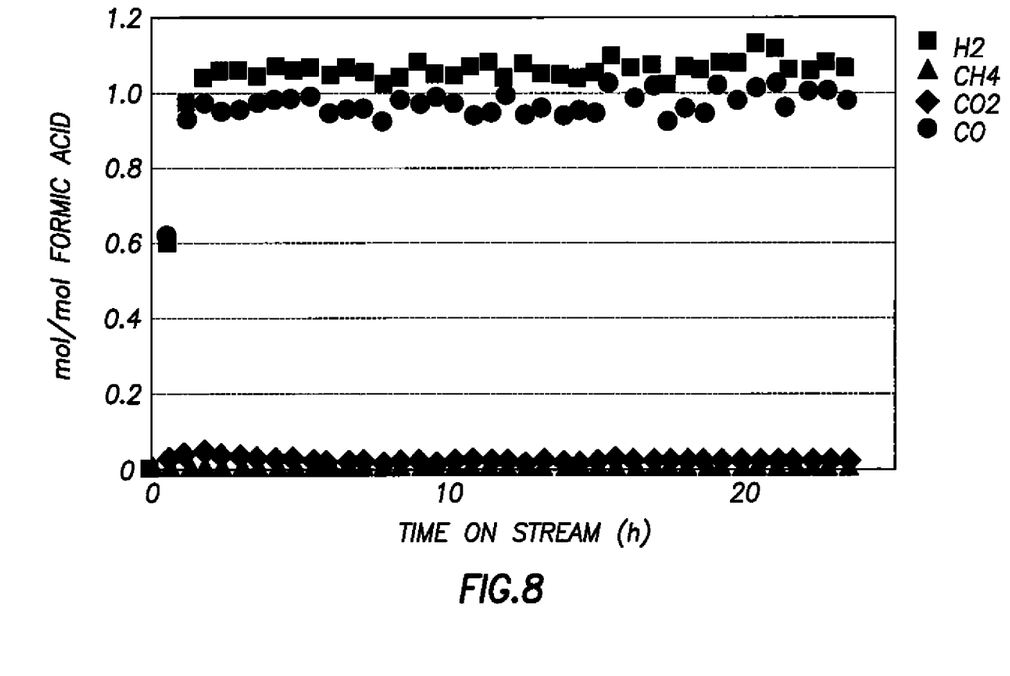
FIG. 8 depicts species yields during the decomposition of a polysaccharide Derivative.

In this example, a polysaccharide hydrolysis derivative, formic acid was reformed at 790.83 kP and 270° C. As shown in FIG. 8, the dominant products were hydrogen and carbon dioxide. Further, it can be inferred from FIG. 8 that there was no significant degradation in process performance since the produced amounts of hydrogen, carbon dioxide, remained fairly constant over several hours of continuous operation.

Example 6

In this example, direct steam reforming of a polysaccharide derivative, ethanol, was conducted using HiFuel™, a commercial SMR catalyst at 790.83 kPa and 270° C. Though the products were similar to that in example 3, however, the system pressure-drop increased rapidly after processing about 207 mL, of the feed primarily due to coke build-up. This further signifies the rapid degradation of conventional SMR catalyst when directly processing oxygenates.

Conversely, over 7000 mL, of the same feed were processed when the process of decomposing the polysaccharide derivative to produce a gaseous product was done prior to introducing the gaseous product into the steam reformer. As such the process was able in more than double the use of the catalyst without coke build-up.

In closing, it should be noted that the discussion of any reference is not an admission that it is prior art to the present invention, especially any reference that may have a publication date after the priority date of this application. At the same time, each and every claim below is hereby incorporated into this detailed description or specification as an additional embodiment of the present invention.

Although the systems and processes described herein have been described in it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A process comprising:
   decomposing a biomass derivative to produce a gaseous product wherein the biomass derivative was steam reformed at a constant pressure with increasing temperature from a temperature range between 100° C. to 500° C.; and
   introducing the gaseous product into a steam reformer.

2. The process of claim 1, wherein the gaseous product is introduced directly into the steam reformer.

3. The process of claim 1, wherein the decomposing of the biomass derivative occurs at a temperature range from 100° C. to 500° C.

4. The process of claim 1, wherein the decomposing of the biomass derivative occurs at a temperature range from 200° C. to 350° C.

5. The process of claim 1, wherein the decomposing of the biomass derivative occurs at a pressure range greater than 101.3 kPa.

6. The process of claim 1, wherein the gaseous product contains less than 0.5 wt % of coke precursors.

7. The process of claim 6, wherein the coke precursors are selected from the group consisting of polynuclear aromatics, alkynes, olefins and combinations thereof.

8. The process of claim 1, wherein the gaseous product contains at least 1 wt % gaseous hydrogen.

9. A process comprising:
   decomposing biomass derivatives with increasing temperature from a temperature range from 100° C. to 500° C. to produce a gaseous product with less than 0.5 wt % of coke precursors and at least 1 wt % gaseous hydrogen wherein the biomass derivative was steam reformed at a constant pressure; and
   introducing the gaseous product directly into a steam reformer.

10. A process consisting essentially of:
    decomposing biomass derivatives to produce a gaseous product; and
    introducing the gaseous product into a steam reformer;
    wherein the biomass derivative was steam reformed at a constant pressure with increasing temperature from a temperature range between 100° C. to 500° C.

11. The process of claim 10, wherein the gaseous product is introduced directly into the steam reformer.

12. The process of claim 10, wherein the decomposing of the biomass derivative occurs at a temperature range from 100° C. to 350° C.

13. The process of claim 10, wherein the decomposing of the biomass derivative occurs at a temperature range from 200° C. to 350° C.

14. The process of claim 10, wherein the decomposing of the biomass derivative occurs at a pressure range greater than 101.3 kPa.

15. The process of claim 10, wherein the gaseous product contains less than 0.5 wt % of coke precursors.

16. The process of claim 15, wherein the coke precursors are selected from the group consisting of polynuclear aromatics, alkynes, ole fins and combinations thereof.

17. The process of claim 10, wherein the gaseous product contains at least 1 wt % gaseous hydrogen.

* * * * *